United States Patent
Yuan et al.

(10) Patent No.: US 8,711,730 B2
(45) Date of Patent: Apr. 29, 2014

(54) SYSTEM AND METHOD FOR IDENTIFYING A TARGET SIGNAL IN AN OPTICAL TRANSPORT NETWORK FRAME STRUCTURE

(75) Inventors: Catherine Haiyan Yuan, Plano, TX (US); David Solomon, River Vale, NJ (US); Vikas Mittal, Murphy, TX (US); Biaodong Cai, San Ramon, CA (US)

(73) Assignee: Fujitsu Limited, Kawasaki-shi (JP)

( * ) Notice: Subject to any disclaimer, the term of this patent is extended or adjusted under 35 U.S.C. 154(b) by 277 days.

(21) Appl. No.: 13/242,945

(22) Filed: Sep. 23, 2011

(65) Prior Publication Data
US 2013/0077974 A1 Mar. 28, 2013

(51) Int. Cl.
*H04J 3/14* (2006.01)
*H04J 14/00* (2006.01)
*H04J 14/08* (2006.01)
*H04L 12/26* (2006.01)

(52) U.S. Cl.
USPC .............................. 370/254; 370/392; 398/43

(58) Field of Classification Search
USPC ........ 370/252, 254, 537, 392; 398/43, 58, 66, 398/25
See application file for complete search history.

(56) References Cited

U.S. PATENT DOCUMENTS

| | | | |
|---|---|---|---|
| 8,274,892 B2 * | 9/2012 | Chiang et al. ................. | 370/235 |
| 2008/0212961 A1 * | 9/2008 | Zhang ............................. | 398/25 |
| 2010/0061728 A1 * | 3/2010 | Virdee ............................ | 398/50 |
| 2010/0183301 A1 * | 7/2010 | Shin et al. ....................... | 398/45 |
| 2012/0106956 A1 * | 5/2012 | Rao et al. ........................ | 398/52 |
| 2012/0201535 A1 * | 8/2012 | Loprieno et al. ............... | 398/45 |
| 2012/0230674 A1 * | 9/2012 | Yuan et al. ...................... | 398/17 |
| 2012/0294610 A1 * | 11/2012 | Genthner et al. ............... | 398/45 |
| 2013/0209087 A1 * | 8/2013 | Yuan et al. ....................... | 398/9 |

* cited by examiner

*Primary Examiner* — Ahmed Elallam
(74) *Attorney, Agent, or Firm* — Baker Botts L.L.P.

(57) ABSTRACT

In accordance with embodiments of the present disclosure, a method for identifying a target signal in an optical transport network frame structure may be provided. The method may include determining an Access Identifier (AID) for the target signal. The method may also include determining at least one attribute for the target signal. The at least one attribute may define at least one of an Optical Transport Network (OTN) multiplexing structure associated with the target signal and one or more attributes associated with one or a higher order or an intermediate higher order optical data unit entity for a supporting entity of a lower order optical data unit associated with the target signal. The method may further include identifying the target signal based on the AID and the at least one attribute.

18 Claims, 3 Drawing Sheets

SYSTEM AND METHOD FOR IDENTIFYING A TARGET SIGNAL IN AN OPTICAL TRANSPORT NETWORK FRAME STRUCTURE

TECHNICAL FIELD OF THE INVENTION

The present invention relates generally to networking and computing systems and, more particularly, to a method and system for identifying a target signal in an Optical Transport Network (OTN) frame structure.

BACKGROUND

Telecommunications systems, cable televisions systems, and data communication networks use communication networks to rapidly convey large amounts of information between remote points. A communication network may include network elements that route packets through the network. Some network elements may include a distributed architecture, wherein packet processing may be distributed among several subsystems of the network element (e.g., line cards).

For many years, the management of communications networks using synchronous optical networking (SONET) and synchronous digital hierarchy (SDH) multiplexing equipment has been primarily based on Transaction Language 1 (TL1) which uses a fixed Access Identifier (AID) representing a containment relationship (e.g., where "A>B" is read as "A contains B"). Some example SONET containment relationships may include:
  OC-N>STS-1>VT (where VT=VT1.5, VT2, VT3, VT6)
  OC-N>STS-Nc (where c=3, 12, or 48) (referred to as "concatenated" Synchronous Transport Signals (STS))

In the case of concatenation, STS-Nc signals must begin on boundaries of 3, 12, or 48 in the concatenated frame OC-N. This, in the case of SONET/SDH, by knowing a signal type (e.g., STS-1, VT2, STS-3c) and the TL1 AID structure (e.g., 1-3-2-6=Shelf 1, Slot 3, Port 2, STS-1 channel #3), one can unambiguously identify the target signal in the SONET/SDH frame structure.

Communications networks are now often configured as an Optical Transport Network (OTN) as defined by ITU Telecommunication Standardization Sector (ITU-T) Recommendation G.709. With OTN, relevant networking standards provide significantly flexible containment relationships for data frames, as compared with prior technologies. However, with OTN, it may not be possible to unambiguously identify a target signal in an OTN frame structure by simply using the target signal's AID, as was the case with prior technologies (e.g., SONET/SDH). For example, consider a system with the following OTN frame multiplexings:
  ODU-3>ODU-flex (ODU-flex AID 1-3-2-4 in the form of shelf-slot-port-channel)
  ODU-2>ODU-1
  ODU-4>ODU-2>ODU-flex (ODU-flex AID 1-3-2-4 in the form of shelf-slot-port-channel).

For the above examples, it may not be possible to unambiguously identify the target signal in the OTN frame by knowing only the target signal type and AID. In particular, the first and third mappings above could have the same AID structure (e.g., 1-3-2-4) and have the same target signal (an ODU-flex signal in both examples) yet the OTN mapping structures are different. This may cause problems with existing transport system software, as such software is often built around the notion of identifying the transport mapping for a given signal type by using the AID, particularly in transport systems built on top of the AID structure. Thus, there is a desire to maintain the AID structure (e.g., in the form of shelf-slot-port-channel) while being able to identify a target signal in the OTN multiplexing structure.

For purposes of illustration throughout the remainder of this disclosure, the first and third example mapping above may be referred to "Example #1" and "Example #3," respectively.

SUMMARY

In accordance with the present invention, disadvantages and problems associated with identifying a target signal in an optical transport network frame structure may be reduced or eliminated.

In accordance with embodiments of the present disclosure, a method for identifying a target signal in an optical transport network frame structure may be provided. The method may include determining an Access Identifier (AID) for the target signal. The method may also include determining at least one attribute for the target signal. The at least one attribute may define at least one of an Optical Transport Network (OTN) multiplexing structure associated with the target signal and one or more attributes associated with one of a higher order or intermediate higher order optical data unit entity for a supporting entity of a lower order optical data unit associated with the target signal. The method may further include identifying the target signal based on the AID and the at least one attribute.

One or more other technical advantages of the present disclosure may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
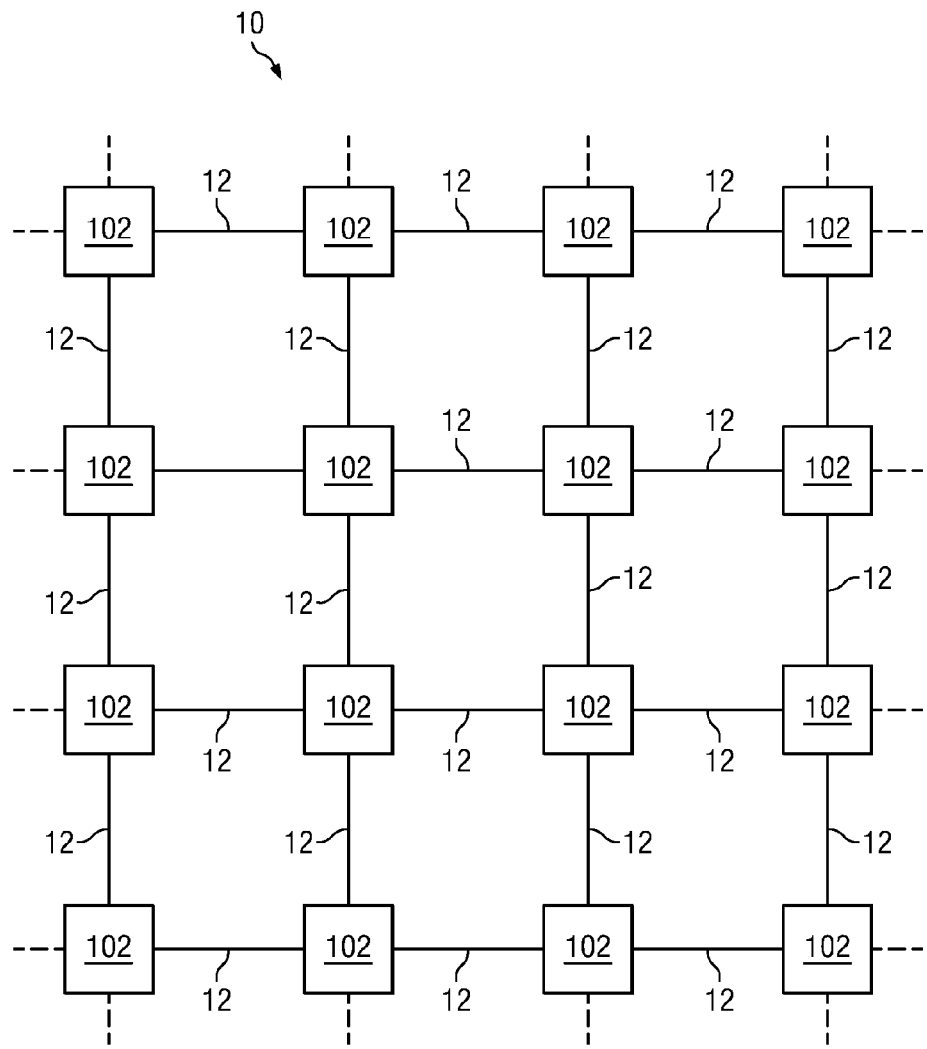
FIG. 1 illustrates a block diagram of an example network, in accordance with embodiments of the present disclosure.
Figure 2:
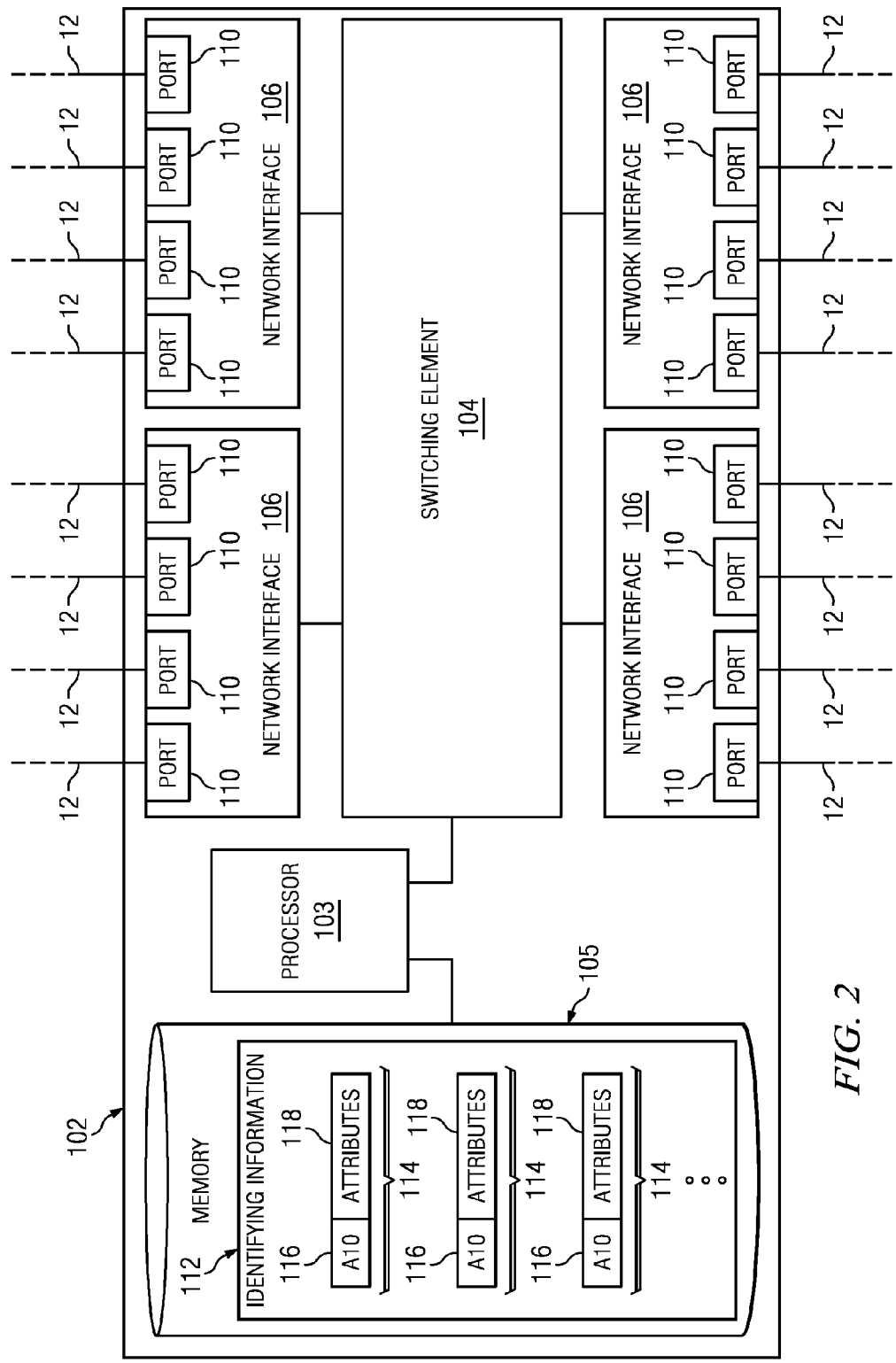
FIG. 2 illustrates a block diagram an example network element, in accordance with embodiments of the present disclosure.
Figure 3:
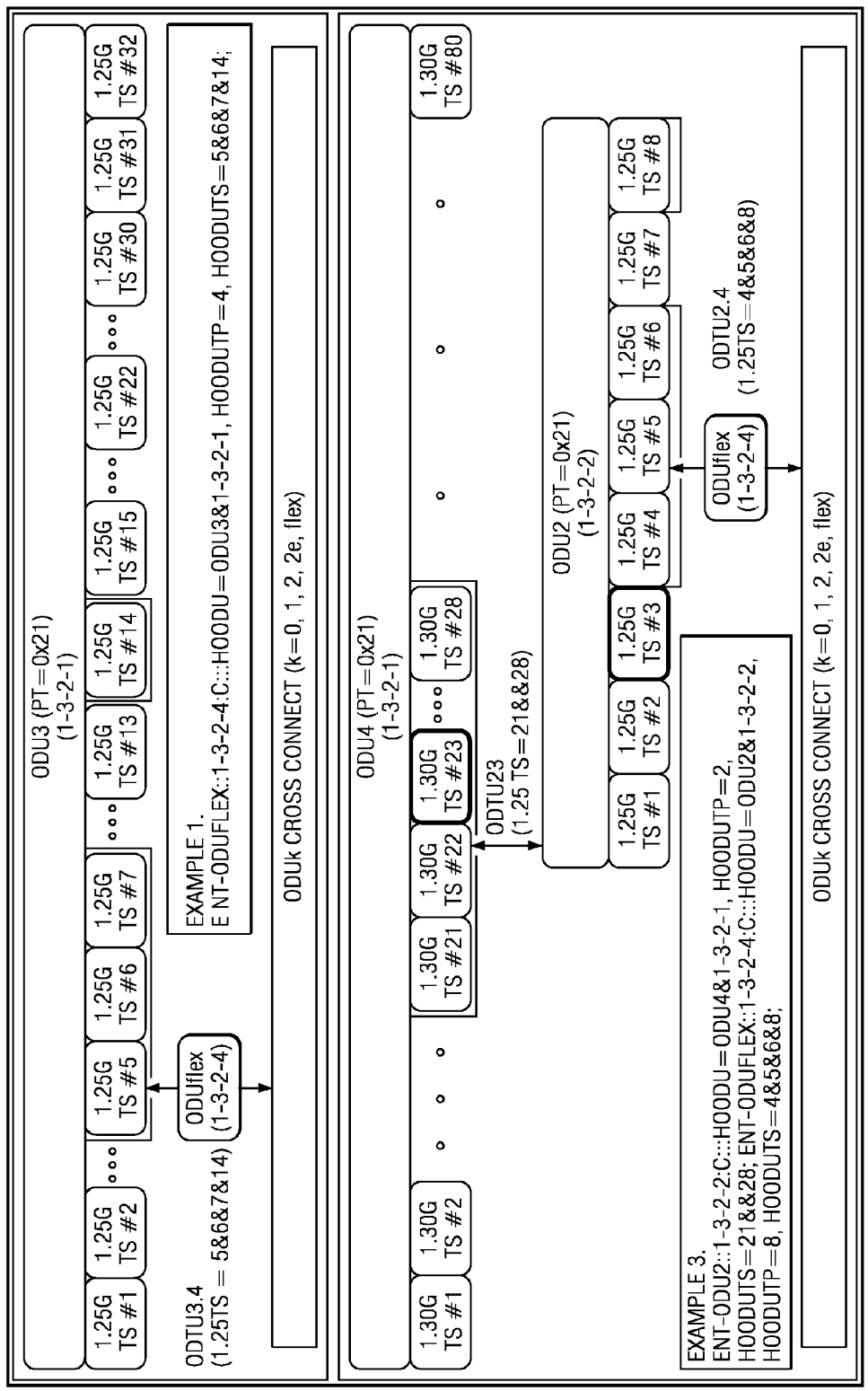
FIG. 3 illustrates examples of identifying target signals in an optical transport network frame structure, in accordance with embodiments of the present disclosure.

Embodiments of the present invention and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an Ethernet network. In these and other embodiments, network 10 may be an optical network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes to create a mesh. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, copper cable, SONET cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "datagram" will be used to generally referred to any data structure used to convey traffic, including without limitation a packet, a frame, an unstructured bit stream, or any other suitable data structure.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. In some embodiments, however, not all network elements 102 may be directly coupled as shown in FIG. 2. Each network element 102 may generally be configured to receive data from and/or transmit data to one or more other network elements 102. In certain embodiments, network element 102 may comprise a switch or router configured to transmit data received by network element 102 to another device (e.g., another network element 102) coupled to network element 102.

As depicted in FIG. 2, network element 102 may include a processor 103, a memory 105, a switching element 104, and one or more network interfaces 106 communicatively coupled to switching element 104.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 105 and/or another component of network element 102. Although FIG. 2 depicts processor 103 as independent of other components of network element 102, in some embodiments one or more processors 103 may reside on network interfaces 106 and/or other components of network elements 102. In operation, processor 103 may process and/or interpret traffic received at a port 110. Accordingly, processor 103 may receive traffic from, or transmit traffic to ports 110 and network elements 106 via switching element 104.

Memory 105 may be communicatively coupled to processor 103 and may include any system, device, or apparatus configured to retain program instructions and/or data for a period of time (e.g., computer-readable media). Memory 105 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off. Although FIG. 2 depicts memory 105 as independent of other components of network element 102, in some embodiments one or more memories 105 may reside on network interfaces 106 and/or other components of network element 102.

As shown in FIG. 2, memory 105 may have stored thereon identifying information 112 for various signals that may be communicated within traffic datagrams (e.g., OTN frames). Identifying information 112 may include one or more entries 114, each entry 114 corresponding to a signal in an OTN frame. Each entry may include an AID 116 for the signal and attributes 118 for the signal. AID 116 may include a four-part identifier in the form of shelf-slot-port-channel, as known in the art. Attributes 118 may include one or more attributes that, when combined with an AID 116, identifies an OTN mapping for a target OTN signal. Attributes 118 associated with an AID 116 in an entry 114 may include one or more of the following:

OTN multiplexing structure to multiplex the target lower order signal (e.g., ODU 2, ODU-1, ODU-flex, ODU-2e, etc.) into the higher order optical data unit (ODU) structure (e.g., ODU4, ODU3, etc.)

Higher Order Optical Data Unit (HOODU): with respect to the signal, the higher order or intermediate higher order optical data unit entity for the supporting entity of the lower order optical data unit.

Higher Order Optical Data Unit Tributary Slots (HOODUTS): the tributary slots selection to map the lower order optical data unit into the higher order or intermediate higher order optical data unit entity's multiplexing structure identifier (MSI).

Higher Order Optical Data Unit Tributary Port (HOODUTP): the tributary port number in the higher order or intermediate higher order optical data unit entity's MSI structure. In a single-stage OTN multiplex, HOODUTP may be fixed to or based on the channel in the target signal AID (and user may not need to specify HOODUTP); in a multiple-stage OTN multiplex, HOODUTP may be manually specified by a user or Network Management System (NMS).

By combining such attributes 118 with an AID 116, a user may be able to fully reconstruct an OTN multiplex structure for a signal. Examples of such reconstruction are depicted in FIG. 3 for Example #1 and Example #3 discussed in the "Background" section.

Returning to FIG. 2 switching element 104 may include any suitable system, apparatus, or device configured to receive traffic via a port 110 and forward such traffic to a particular network interface 106 and/or port 110 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF).

Each network interface 106 may be communicatively coupled to switching element 104 and may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

A component of network 10 and/or a network element 102 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for identifying a target signal in an optical transport network frame structure, comprising:
   storing an Access Identifier (AID) for the target signal;
   storing at least one attribute for the target signal, the at least one attribute defining:
      an Optical Transport Network (OTN) multiplexing structure associated with the target signal; and
      one or more attributes associated with a one or a higher order or intermediate higher order optical data unit entity for a supporting entity of a lower order optical data unit associated with the target signal; and
   identifying the target signal based on the stored AID and the at least one stored attribute.

2. A method according to claim 1, wherein the one or more attributes associated with the higher order or intermediate higher order optical data unit entity includes an identity of the higher order optical data unit entity.

3. A method according to claim 1, wherein the one or more attributes associated with the higher order or intermediate higher order optical data unit entity includes an identity of one or more tributary slots mapping the lower order optical data unit into the higher order or intermediate higher order optical data unit's multiplexing structure.

4. A method according to claim 1, wherein the one or more attributes associated with the higher order or intermediate higher order optical data unit entity includes an identity of a tributary port number in the higher order or intermediate higher order optical data unit's multiplexing structure.

5. A method according to claim 4, wherein in a single stage OTN multiplexing, the identity of the tributary port number is specified as a channel number of an AID to the target signal of the higher order optical data unit.

6. A method according to claim 4, wherein in a multiple stage OTN multiplexing, the identity of the tributary port number is set by a user.

7. A network element comprising:
   a memory having embodied thereon one or more entries, each entry associated with a signal and including:
      an Access Identifier (AID) for the signal;
      at least one attribute for the signal, the at least one attribute defining:
         an Optical Transport Network (OTN) multiplexing structure associated with the target signal; and
         one or more attributes associated with one or more of a higher order or intermediate higher order optical data unit entity for a supporting entity of a lower order optical data unit associated with the target signal; and
   a processor communicatively coupled to the memory and configured to identify a target signal from the entries based on the AID and the at least one attribute associated with the target signal.

8. A network element according to claim 7, wherein the one or more attributes associated with the higher order or intermediate higher order optical data unit entity includes an identity of the higher order optical data unit entity.

9. A network element according to claim 7, wherein the one or more attributes associated with the higher order or intermediate higher order optical data unit entity includes an identity of one or more tributary slots mapping the lower order optical data unit into the higher order or intermediate higher order optical data unit's multiplexing structure.

10. A network element according to claim 7, wherein the one or more attributes associated with the higher order or intermediate higher order optical data unit entity includes an identity of a tributary port number in the higher order or intermediate higher order optical data unit's multiplexing structure.

11. A network element according to claim 10, wherein in a single stage OTN multiplexing, the identity of the tributary port number is specified as a channel number of an AID to the target signal of the higher order optical data unit.

12. A network element according to claim 10, wherein in a multiple stage OTN multiplexing, the identity of the tributary port number is set by a user.

13. A non-transitory computer-readable medium storing logic for configuring admission control of service instances in a network element, the logic configured when executed by a processor to:
store an Access Identifier (AID) for the target signal;
store at least one attribute for the target signal, the at least one attribute defining:
an Optical Transport Network (OTN) multiplexing structure associated with the target signal; and
one or more attributes associated with one of a higher order or an intermediate higher order optical data unit entity for a supporting entity of a lower order optical data unit associated with the target signal; and
identify the target signal based on the stored AID and the at least one stored attribute.

14. A non-transitory computer-readable medium storing logic according to claim 13, wherein the one or more attributes associated with the higher order or intermediate higher order optical data unit entity includes an identity of the higher order optical data unit entity.

15. A non-transitory computer-readable medium storing logic according to claim 13, wherein the one or more attributes associated with the higher order or intermediate higher order optical data unit entity includes an identity of one or more tributary slots mapping the lower order optical data unit into the intermediate higher order optical data unit's multiplexing structure.

16. A non-transitory computer-readable medium storing logic according to claim 13, wherein the one or more attributes associated with the higher order or intermediate higher order optical data unit entity includes an identity of a tributary port number in the higher order or intermediate higher order optical data unit's multiplexing structure.

17. A non-transitory computer-readable medium storing logic according to claim 16, wherein in a single stage OTN multiplexing, the identity of the tributary port number is specified as a channel number of an AID to the target signal of the higher order optical data unit.

18. A non-transitory computer-readable medium storing logic according to claim 16, wherein in a multiple stage OTN multiplexing, the identity of the tributary port number is set by a user.

* * * * *